US006235259B1

United States Patent
Ledoux et al.

(10) Patent No.: US 6,235,259 B1
(45) Date of Patent: May 22, 2001

(54) METHOD AND CATALYST FOR DIRECT SULPHUR OXIDATION OF $H_2S$ CONTAINED IN A GAS

(75) Inventors: Marc Ledoux, Strasbourg; Nougayrede Jean, Pau; Savin-Poncet Sabine, Buros; Pham Huu Cuong, Saverne; Keller Nicolas, Strasbourg; Crouzet Claude, Strasbourg, all of (FR)

(73) Assignee: Elf Exploration Production, Paris (FR)

( * ) Notice: Subject to any disclaimer, the term of this patent is extended or adjusted under 35 U.S.C. 154(b) by 0 days.

(21) Appl. No.: 09/383,153

(22) Filed: Aug. 25, 1999

Related U.S. Application Data

(63) Continuation of application No. PCT/FR98/02879, filed on Dec. 24, 1998.

(30) Foreign Application Priority Data

Dec. 29, 1997 (FR) .................................................. 97 16617

(51) Int. Cl.⁷ ............................ B01D 53/52; C01B 17/04
(52) U.S. Cl. .................................... 423/573.1; 423/576.2; 423/576.8
(58) Field of Search .............................. 423/573.1, 576.2, 423/576.8, DIG. 6

(56) References Cited

U.S. PATENT DOCUMENTS

| | | | |
|---|---|---|---|
| 4,937,221 | * | 6/1990 | Erekson et al. ..................... 502/222 |
| 5,152,970 | * | 10/1992 | Van Der Wal et al. .............. 423/230 |
| 5,494,650 | * | 2/1996 | Kvasnikoff et al. ................. 423/220 |
| 5,653,953 | * | 8/1997 | Li et al. .............................. 423/576.8 |

FOREIGN PATENT DOCUMENTS

| | | | | |
|---|---|---|---|---|
| 2702675 A1 | * | 9/1994 | (FR) | ................... 423/576.8 |
| 2727101 A1 | * | 5/1996 | (FR) | . |
| 2088903 | * | 6/1982 | (GB) | . |
| 2143225 | * | 2/1985 | (GB) | ................... 423/576.8 |
| WO 97/19019 | * | 5/1997 | (WO) | . |

* cited by examiner

*Primary Examiner*—Steven P. Griffin
*Assistant Examiner*—Timothy C Vanoy
(74) *Attorney, Agent, or Firm*—Schnader Harrison Segal & Lewis LLP

(57) ABSTRACT

A regenerative process for oxidizing $H_2S$ contained in low concentration in a gas directly to sulphur including combining the $H_2S$-containing gas with a gas containing free oxygen in an amount to form an $O_2/H_2S$-containing gas with an $O_2/H_2S$ molar ratio ranging from 0.05 to 15; contacting the $O_2/H_2S$-containing gas with a catalyst for the selective oxidation of $H_2S$ to sulphur, wherein the catalyst includes a catalytically active phase containing at least one oxysulphide of at least one metal selected from the group consisting of nickel, iron, cobalt, copper, chromium, molybdenum and tungsten combined with a silicon carbide support and including a compound of at least one transition metal, at temperatures below the dew point of the sulphur formed by oxidation of $H_2S$ and depositing the sulphur on the catalyst; periodically regenerating by flushing the sulphur-laden catalyst using a non-oxidizing gas at temperatures of between 200° C. and 500° C. to vaporize sulphur retained on the catalyst; and cooling the regenerated catalyst below the dew point of the sulphur to a temperature for $H_2S$ oxidation to be carried out again, such cooling being carried out by a gas having a temperature less than 180° C.

31 Claims, 3 Drawing Sheets

METHOD AND CATALYST FOR DIRECT SULPHUR OXIDATION OF H₂S CONTAINED IN A GAS

RELATED APPLICATIONS

This application is a continuation of PCT/FR98/02879, with an international filing date of Dec. 24, 1998, which is based on French Patent Application No. 97/16617, filed Dec. 29, 1997.

FIELD OF THE INVENTION

The invention relates to a catalytic process for oxidizing, at low temperature, the $H_2S$ contained in low concentration in a gas directly to sulphur. It also relates to a catalyst for the implementation of this process.

BACKGROUND

In order to recover the $H_2S$ contained in low concentration, namely a concentration of less than 20% by volume and more particularly between 0.001% and 20% and most particularly ranging from 0.001% to 10% by volume, in gases from various sources, use may especially be made of processes involving a direct catalytic oxidation of $H_2S$ to sulphur according to the reaction:

$$H_2S + \tfrac{1}{2}O_2 \rightarrow S + H_2O.$$

In such processes, the $H_2S$-containing gas to be treated, mixed with a suitable amount of a gas containing free oxygen, for example air, oxygen or oxygen-enriched air, is brought into contact with a catalyst for oxidizing $H_2S$ to sulphur by carrying out this contact at temperatures either above the dew point of the sulphur formed, in which case the sulphur formed is present in the vapour state in the reaction medium coming from the reaction, or at temperatures below the dew point of the sulphur formed, in which case the sulphur is deposited on the catalyst, thereby requiring the sulphur-laden catalyst to be periodically regenerated by flushing with a non-oxidizing gas having a temperature of between 200° C. and 500° C.

In particular, the oxidation of $H_2S$ to sulphur at temperatures above the dew point of the sulphur, that is to say at temperatures greater than approximately 180° C., may be carried out in contact with a catalyst consisting of titanium oxide (EP-A-0,078,690), titanium oxide containing an alkaline-earth metal sulphate (WO-A-8302068), titanium oxide containing nickel oxide and optionally aluminium oxide (EP-A-0,140,045), an oxide of the titanium oxide or zirconium oxide or silica type, combined with one or more compounds of transition metals chosen from Fe, Cu, Zn, Cd, Cr, Mo, W, Co and Ni, preferably Fe, and optionally with one or more compounds of precious metals chosen from Pd, Pt, Ir and Rh, preferably Pd (FR-A-2,511,663) or else a thermally stabilized alumina combined with one or more compounds of transition metals, such as those mentioned above, especially Fe, and optionally with one or more compounds of precious metals chosen from Pd, Pt, Ir and Rh (FR-A-2,540,092).

As regards the oxidation of $H_2S$ to sulphur at temperatures such that the sulphur formed is deposited on the catalyst, this may be carried out in contact with a catalyst consisting, for example, of one or more compounds such as salts, oxides or sulphides of transition metals, for example, Fe, Cu, Cr, Mo, W, V, Co, Ni, Ag and Mn, in combination with a support of the activated-alumina, bauxite, silica/alumina or zeolite type (FR-A-2,277,877). This oxidation of $H_2S$ with deposition of sulphur on the catalyst may also be carried out in contact with a catalyst consisting of a catalytic phase, chosen from the oxides, salts or sulphides of the metals V, Mo, W, Ni and Co combined with a support made of active carbon (French Patent Application No. 93/02996 of 16.03.1993).

The catalysts as mentioned above, consisting of a catalytic phase based on at least one oxide, salt or sulphide of a transition metal and combined with a support consisting of at least one material chosen from alumina, titanium oxide, zirconium oxide, silica, zeolites, silica/alumina mixtures, silica/titanium oxide mixtures and active carbon, which are used for the catalytic oxidation of $H_2S$ to sulphur, still have certain inadequacies in prolonged use. In particular, the catalysts which have an alumina-based support are susceptible to changing over time by sulphurization. With regard to the catalysts whose support consists of active carbon, precautions must be taken during their use to prevent combustion of the support. In addition, for these various catalysts, the catalytic phase impregnating the support has a tendency to migrate into the intersticies of the support, and thereby making it difficult, or indeed often impossible, to recover the metal from the catalytic phase in the spent catalyst. Finally, the aforementioned catalysts have a mediocre thermal conductivity, which means that the temperature within the catalytic beds containing them cannot be effectively controlled by heat exchange with a coolant.

In order to remedy the drawbacks of the catalysts of the abovementioned type, which are used in processes for the catalytic oxidation of $H_2S$ to sulphur, and thus to obtain a process resulting in an improved sulphur selectivity that continues, lastingly, over time, the Applicant in the citations FR-A-2,727,101 and WO-A-97/19019 has proposed to carry out the direct oxidation of $H_2S$ to sulphur in contact with a catalyst formed from a silicon carbide support combined with a catalytically active phase containing at least one transition metal, especially Ni, Co, Fe, Cu, Ag, Mn, Mo, Cr, Ti, W and V, in the oxide or salt form and/or in the elemental state.

In particular, the citations FR-A-2,727,101 and WO-A-97/19019 describe an implementation of the process for the direct oxidation of $H_2S$ to sulphur in contact with the catalyst having a silicon carbide support, in which the oxidation is carried out at temperatures below the dew point of the sulphur formed by this oxidation, which sulphur is deposited on the catalyst, the oxidation catalyst coated with sulphur is then periodically regenerated by flushing with a non-oxidizing gas, this being carried out at temperatures of between 200° C. and 500° C. and preferably between 230° C. and 450° C., in order to vaporize the sulphur retained on the catalyst, and thereafter the regenerated catalyst is cooled down, below the dew point of the sulphur, to the temperature required for the $H_2S$ oxidation to be carried out again, this cooling being carried out by means of a gas having a temperature of less than 180° C.

SUMMARY OF THE INVENTION

By continuing its research, the Applicant has found that the desulphurizing activity and the sulphur selectivity of the catalyst with a silicon carbide support in the aforementioned regenerative process, carried out at temperatures below the dew point of the sulphur produced, could be further improved by carrying out the $H_2S$ oxidation to sulphur using an active phase of the catalyst which contains one or more oxysulphides of some of the aforementioned transition metals and which, in a preferred embodiment, is restored by a particular treatment before each new $H_2S$ oxidation phase.

The subject of the invention is therefore a regenerative process for oxidizing, by a catalytic route, the $H_2S$ contained in low concentration in a gas directly to sulphur, the process being of the type in which the $H_2S$-containing gas with a gas containing free oxygen, in a suitable amount so as to give an $O_2/H_2S$ molar ratio ranging from 0.05 to 15, is made to come into contact with a catalyst for the selective oxidation of $H_2S$ to sulphur, which consists of a catalytically active phase combined with a silicon carbide support and consisting of a compound of at least one transition metal, the process being carried out at temperatures below the dew point of the sulphur formed by the oxidation of $H_2S$, which sulphur is deposited on the catalyst, the sulphur-laden oxidation catalyst is then periodically regenerated by flushing using a non-oxidizing gas, the process being carried out at temperatures of between 200° C. and 500° C. and preferably between 230° C. and 450° C., in order to vaporize the sulphur retained on the catalyst, and thereafter the regenerated catalyst is cooled down, below the dew point of the sulphur, to the temperature required for the $H_2S$ oxidation to be carried out again, this cooling being carried out by means of a gas having a temperature of less than 180° C., and it is characterized in that the active phase of the catalyst contains at least one oxysulphide of at least one metal chosen from nickel, iron, cobalt, copper, chromium, molybdenum and tungsten.

As indicated above, the $H_2S$-to-sulphur oxidation reaction is carried out at temperatures below the dew point of the sulphur produced and more particularly at temperatures of between 30° C. and 180° C. According to a preferred embodiment, the $H_2S$-to-sulphur oxidation reaction is carried out at temperatures of between 35° C. and 70° C. and more particularly at temperatures ranging from 40° C. to 65° C.

In this preferred embodiment, the $H_2S$-containing gas is brought into contact with the oxidation catalyst at a temperature of between 35° C. and 70° C. and more particularly of between 40° C. and 65° C., the temperature being advantageously less than or equal to the temperature chosen for the $H_2S$-to-sulphur oxidation reaction.

According to another preferred embodiment, the regenerated catalyst is then brought into contact, at temperatures of less than 250° C. and for a time of between 0.2 and 3 hours, with an oxygenated gas stream consisting of an inert carrier gas containing 0.1% to 3% oxygen and 0% to 50% water by volume, in order to restore the metal oxysulphide phase of the catalyst.

The active phase of the oxidation catalyst, usually represents, in terms of the weight metal, 0.1 to 20%, more particularly 0.2 to 15% and more especially 0.2 to 7% of the weight of the catalyst.

The silicon carbide support advantageously forms at least 40% and more particularly at least 50% of the weight of the oxidation catalyst.

The specific surface area of the $H_2S$-to-sulphur oxidation catalyst may vary quite widely depending on the conditions under which the oxidation process is carried out. Advantageously, the specific surface area, determined by the BET nitrogen adsorption method at the temperature of liquid nitrogen (NF X 11-621 standard), may represent 0.1 $m^2/g$ to 600 $m^2/g$ and more especially 2 $m^2/g$ to 300 $m^2/g$.

The oxidation catalyst with a silicon carbide support may be prepared, for example, as follows. The support, which is in the form of a powder, pellets, granules, extruded particles or other forms of agglomerates, is firstly impregnated by means of a solution or of a sol, in a solvent such as water, of the desired metal or metals in the form of salts and then the support thus impregnated is dried and the dried product calcined at temperatures that may range from 250° C. to 500° C., which process may or may not be carried out in an inert atmosphere. Next, the calcined catalyst is subjected to a sulphurization treatment by bringing it into contact with a sulphurizing agent consisting of elemental sulphur or a gas mixture consisting of $H_2S$ and an inert gas, which process is carried out at temperatures of between 250° C. and 400° C. and for a time long enough to achieve maximum sulphurization of the metal or metals of the active phase of the catalyst. The sulphurized catalyst is then brought into contact, at temperatures of less than 250° C., and especially between 30° C. and 200° C., and for a time of between 0.2 and 3 hours, and more especially between 0.5 and 2 hours, with an oxygenated gas stream consisting of an inert carrier gas containing 0.1% to 3% and more especially 0.3% to 1.5% oxygen and 0% to 50% and more especially 0.5% to 30% water, in order to form the metal oxysulphide phase. The amount of elemental sulphur used for sulphurizing the calcined impregnated support advantageously represents a slight excess, for example an excess ranging up to 300 mol %, with respect to the stoichiometric amount corresponding to maximum sulphurization of the metal or metals of the active phase of the catalyst. The duration of the sulphurization treatment with elemental sulphur is advantageously between 0.5 and 4 hours. The gas mixture, consisting of $H_2S$ and inert gas, used as sulphurizing agent advantageously contains between 0.2% and 30% $H_2S$ by volume. The duration of the sulphurization treatment with the gas mixture containing $H_2S$ is generally between 0.5 and 15 hours.

The silicon carbide used for forming the support for the $H_2S$-to-sulphur oxidation catalyst may consist of any one of the known silicon carbides as long as it has the required specific surface area requirements, namely a specific surface area, determined by the BET nitrogen adsorption method, ranging from 0.1 $m^2/g$ to 600 $m^2/g$.

In particular, the silicon carbide may be prepared using any one of the techniques which are described in the citations EP-A-0,313,480 (corresponding to U.S. Pat. No. 4,914,070), EP-A-0,440,569, EP-A-0,511,919, EP-A-0,543,751 and EP-A-0,543,752.

The gas containing free oxygen used for the oxidation of the $H_2S$ contained in the gas to be treated to sulphur is generally air, although it is possible to use pure oxygen, oxygen-enriched air or even mixtures, in various proportions, of oxygen and an inert gas other than nitrogen.

The gas containing free oxygen and the gas to be treated containing $H_2S$ may be brought separately into contact with the oxidation catalyst. However, in order to obtain a very homogeneous gaseous reaction mixture during contact with the catalyst, it is preferable firstly to mix the gas to be treated containing $H_2S$ with the gas containing free oxygen and thus to bring the mixture produced into contact with the oxidation catalyst.

As indicated above, the gas containing free oxygen is used in an amount suitable for providing an $O_2/H_2S$ molar ratio ranging from 0.05 to 15, more particularly from 0.1 to 10 and most especially from 0.1 to 4 in the reaction mixture coming into contact with the $H_2S$-to-sulphur oxidation catalyst.

The times during which the gaseous reaction mixture is in contact with the oxidation catalyst may range from 0.5 to 20 seconds and preferably from 1 to 12 seconds, these values being given under the standard pressure and temperature conditions.

The gas containing $H_2S$ in low concentration, which is treated by the process according to the invention, may come from various sources. In particular, such a gas may be a natural gas having a low $H_2S$ content or a gas coming from the gasification of coal or of heavy oils, or even a gas resulting from the hydrogenation of a residual gas, for example a residual gas from a sulphur plant, containing sulphur compounds, such as $SO_2$, mercaptans, COS, $CS_2$, which are converted into $H_2S$ by the action of hydrogen or of water vapour, or else a gas resulting from the treatment, in contact with a Claus catalyst capable of promoting the sulphur-formation reaction between $H_2S$ and $SO_2$, of a gaseous effluent containing $H_2S$ and $SO_2$ in an $H_2S/SO_2$ molar ratio of greater than 2/1, and such that the resulting gas above all contains $H_2S$ and no or very little $SO_2$ as sulphur compounds. The process according to the invention can be applied to the treatment of gas containing $H_2S$ in a concentration of between 0.001% and 25% by volume and more especially ranging from 0.01% to 20% by volume. The gas to be treated may also contain organic sulphur compounds, such as mercaptans, COS and $CS_2$, in an overall concentration that may range up to approximately 1% by volume. It would be possible, using the process according to the invention, to treat gases containing $H_2S$ in a concentration greater than 25% by volume, however in this case it is preferred to use the conventional sulphur-production processes comprising a thermal reaction step.

The $H_2S$-containing gas, which is oxidized in contact with the catalyst with a silicon carbide support, may be free of water or substantially free of water or, on the contrary, it may contain quite a high amount of water. Thus, it is possible according to the invention to treat an $H_2S$-containing gas which has a water content that can range from 0% to approximately 50% by volume. Advantageously, above all when the active phase of the catalyst with a silicon carbide support is a nickel oxysulphide, the presence, in the $H_2S$-containing gas to be treated, of an amount of water ranging from 10% to 50% by volume and more especially from 15% to 30% by volume makes it possible for the time during which the effectiveness of the catalyst is maintained at an optimum level to be substantially increased.

If the temperature of the reaction mixture after the oxidation cannot exceed the upper limit of the range of oxidation temperatures, the $H_2S$-to-sulphur oxidation may be carried out adiabatically. If this is not the case, the heat released by the oxidation reaction is removed by cooling the catalyst, by any known method, in order to maintain the oxidation temperature at the chosen value or in the chosen range. For example, the cooling may be carried out using a cold fluid flowing in direct heat exchange with the catalyst or else in indirect heat exchange with the said catalyst within the latter. The process may also be carried out by placing the catalyst in a tube reactor consisting of tubes arranged in a shell with, for example, the catalyst present in the tubes and a cold fluid circulating between the tube on the shell side, or visa versa. The catalytic oxidation may also be carried out in a reactor having several catalyst stages with cooling of the reaction mixture between the successive stages by indirect heat exchange with a cold fluid, the heat exchange taking place inside or outside the oxidation reactor.

When the oxidation is carried out at temperatures of between 35° C. and 70° C. and more particularly ranging from 40° C. to 65° C. and when the $H_2S$-containing gas which is treated according to the invention is available at temperatures greater than 70° C., it is therefore advisable to cool it to a temperature chosen between 35° C. and 70° C. before bringing it into contact with the $H_2S$-to-sulphur oxidation catalyst. If the gas to be treated contains, in addition to $H_2S$, quite a large amount of water, for example between 10% and 50% by volume, quite a large fraction of this water will consequently condense during the cooling and may or may not be separated from the gas to be treated which is cooled before the latter comes into contact with the oxidation catalyst.

According to a first method of implementation, the cooling of the gas to be treated is carried out in such a way that the cooled gas has a water vapour content of less than approximately 10% by volume, the condensed water being separated from the cooled gas before the latter is brought into contact with the $H_2S$ oxidation catalyst.

According to a second method of implementation, the water condensed during the cooling of the gas to be treated is not separated from the cooled gas and a gas/condensed water mixed phase is brought into contact with the $H_2S$ oxidation catalyst, the temperature in the oxidation zone is maintained at the value chosen between 35° C. and 70° C. and more especially ranging from 40° C. to 65° C. by injecting, into the said zone, a stream of cooled water circulating continuously as a countercurrent with respect to the gas to be treated, a purified gas substantially free of sulphur compounds is discharged from the top of the oxidation zone and a stream of water laden with solid sulphur particles is withdrawn from the bottom of the zone, and a portion of the stream of water is recycled, after separating the sulphur that it contains and cooling, in order to form the stream of cooling water injected into the oxidation zone.

According to a third method of implementation, which constitutes a variant of the second, the water condensed during the cooling of the gas to be treated is not separated from the cooled gas and a gas/condensed water mixed phase is brought into contact with the $H_2S$ oxidation catalyst, the temperature in the oxidation zone is maintained at the value chosen between 35° C. and 70° C. and more especially ranging from 40° C. to 65° C. by injecting, into the zone, a stream of cooled water circulating continuously as a cocurrent with respect to the gas to be treated, a purified gas/condensed water mixture, laden with solid sulphur particles, is withdrawn from the bottom of the oxidation zone, the mixture is separated into a stream of purified gas, which is discharged, and an aqueous phase and a portion of this aqueous phase, after separating the sulphur that it contains and cooling, is recycled in order to form the stream of cooling water injected into the oxidation zone.

The flushing gas, used for regenerating the sulphur-laden catalyst, may for example be methane, nitrogen, $CO_2$, or mixtures of such gases, or may also consist of a fraction of the gas stream coming from the oxidation step or a fraction of the gas to be treated. The flushing gas used for the aforementioned regeneration may optionally contain a certain proportion of a gaseous reducing compound such as, for example, $H_2$, CO or $H_2S$, at least during the final phase of the regeneration, that is to say after most of the sulphur deposited on the oxidation catalyst has been vaporized.

The implementation of the oxidation reaction according to the invention at temperatures below the dew point of the sulphur formed may be carried out in a single oxidation zone containing the oxidation catalyst with a silicon carbide support, which operates alternately in oxidation phase and in regeneration/cooling phase. Such an implementation is adopted when the gas to be treated contains little $H_2S$ and consequently when the regeneration of the catalyst is not very frequent. Advantageously, the implementation of the catalytic reaction is carried out in a plurality of oxidation zones each containing the oxidation catalyst with a silicon carbide support, which operate in such a way that at least one of the zones is operating in the regeneration/cooling phase while the other zones are in the catalytic oxidation phase. The process may also be carried out by having one or more zones in the oxidation reaction phase, at least one zone in the regeneration phase and at least one zone in the cooling phase.

The gas used for regenerating the oxidation catalyst preferably circulates in a closed circuit from a heating zone, passing in succession through the catalytic zone during regeneration, and a cooling zone in which most of the sulphur present in the gas is separated by condensation, before returning to the heating zone. Of course, the regeneration gas may also circulate in an open circuit.

The gas used for cooling the regenerated oxidation catalyst is of the same type as that employed for regenerating the sulphur-laden catalyst. The regeneration gas circuits and the cooling gas circuits may be independent of each other. However, according to one embodiment, the regeneration gas circuit, defined above, may also include a branch connecting the output of its cooling zone to the input of the zone undergoing regeneration by by-passing its heating zone, thereby making it possible to short-circuit the heating zone and thus use the regeneration gas as cooling gas.

After each regeneration of the sulphur-laden catalyst, the restoration of the active phase of the catalyst is carried out by bringing the regenerated catalyst into contact, at temperatures of less than 250° C. and especially between 30° C. and 200° C. and for a time of between 0.2 and 3 hours and more especially between 0.5 and 2 hours, with an oxygenated gas stream consisting of an inert carrier gas containing 0.1% to 3% and more especially 0.3 to 1.5% oxygen and 0% to 50% and more especially 0.5 to 30% water, by volume. The restoration of the oxysulphide active phase of the regenerated catalyst may be carried out after the regenerated catalyst has been cooled or during the cooling of the regenerated catalyst.

Other advantages and characteristics will emerge when reading the description given below of three methods of implementation of the process according to the invention, which are suitable for the treatment of the residual gases from sulphur plants and are implemented in the apparatuses shown diagrammatically in FIGS. 1 to 3 of the appended drawing, the $H_2S$-to-sulphur oxidation being carried out at temperatures of between 35° C. and 70° C.

BRIEF DESCRIPTION OF THE DRAWINGS

In these figures, the identical elements in one or other figure are identified by the same reference symbols.

DETAILED DESCRIPTION OF THE INVENTION

Figure 1:
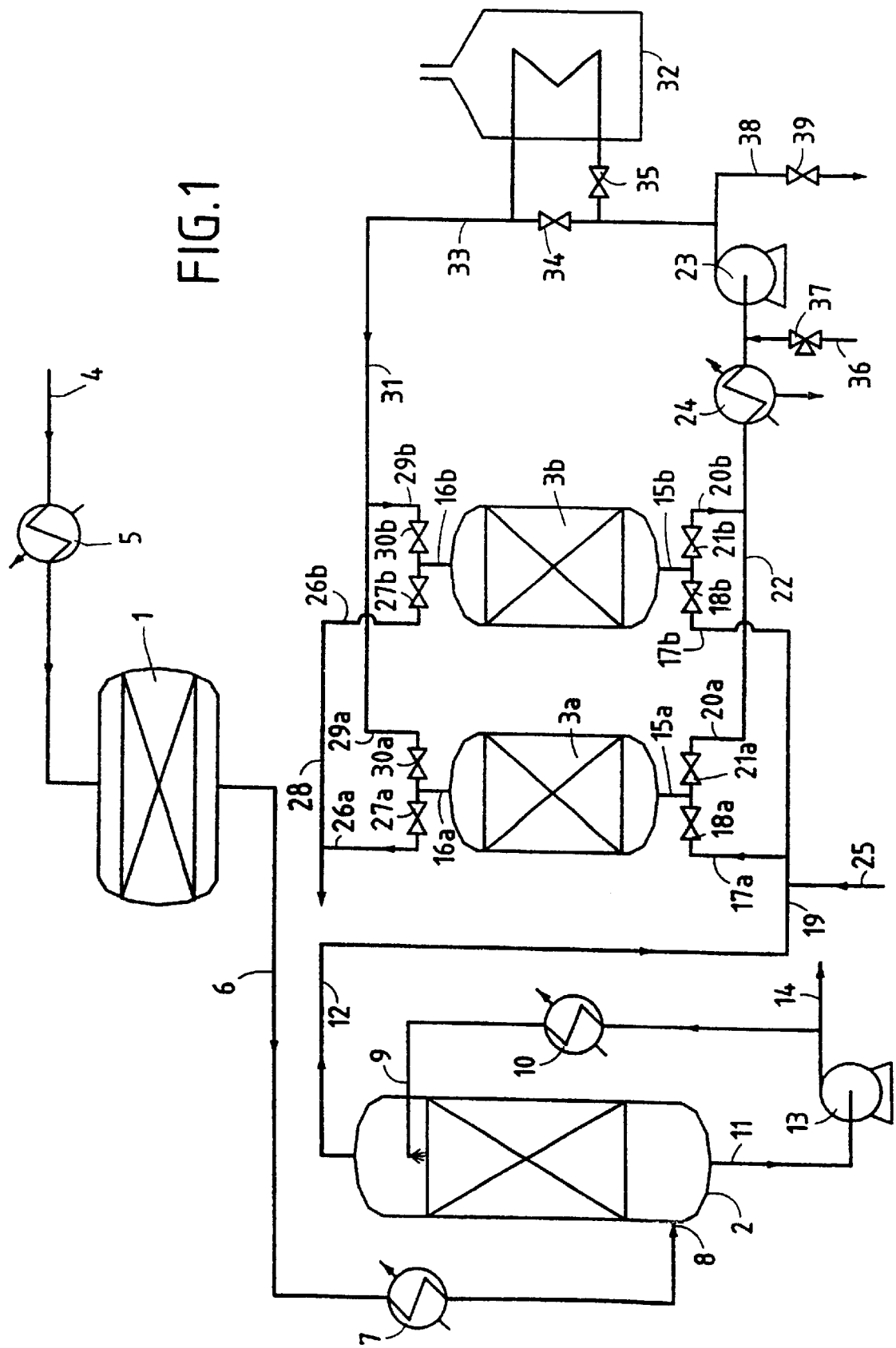
FIG. 1 shows an apparatus in which the $H_2S$-to-sulphur oxidation is carried out in a reactor operating adiabatically.

The apparatus shown in FIG. 1 combines a hydrogenation and hydrolysis reactor 1, a scrubbing tower 2 and two catalytic oxidation reactors 3a and 3b, the catalytic oxidation reactors being mounted in parallel and each containing a bed of an $H_2S$-to-sulphur oxidation catalyst. The reactor 1 has, on the one hand, a line 4 for feeding the residual gas to be treated, coming from a sulphur plant or from a treatment unit, for example a SULFREEN unit, which produces a residual gas of comparable composition, in which line a heater 5 is inserted, and, on the other hand, a discharge line 6 for the gases which is connected, via an indirect heat exchanger 7 operating as a cooler, to an inlet 8 made in the lower part of the scrubbing tower 2. This tower includes a water spray line 9, which emerges in its upper half and in which line a cooler 10 is inserted, and furthermore has, at the bottom, a line 11 for withdrawing liquid and, at the top, a line 12 for discharging gas. The line 11 is connected to the intake of a pump 13, the delivery port of which is extended by a line 14 for discharging liquid, on which the line 9 is mounted as a branch.

The catalytic oxidation reactors 3a and 3b are provided with a first line, respectively 15a and 15b, and with a second line, respectively 16a and 16b, these lines being located on either side of the catalytic bed present in each of the said reactors. The line 15a of the reactor 3a is connected, on the one hand, via a line 17a provided with a valve 18a, to a line 19 which itself is connected to the line 12 and, on the other hand, via a line 20a provided with a valve 21a, to a line 22 which is itself connected to the intake orifice of a blower 23 and on which line a sulphur condenser 24 is mounted. Likewise, the line 15b of the reactor 3b is connected, on the one hand, via a line 17b provided with a valve 18b, to the line 19, downstream of the junction of the line 17a with the said line 19, and, on the other hand, via a line 20b provided with a valve 21b, to the line 22 at a point on the latter lying between the line 20a and the sulphur condenser 24. Upstream of its connection to the line 17a, the line 19 has, as a branch, an inlet 25 for the addition of a gas containing free oxygen.

The line 16a of the reactor 3a is connected, on the one hand, via a line 26a provided with a valve 27a, to a line 28 for discharging the purified residual gas into an incineration reactor (not shown) and from there into the atmosphere and, on the other hand, via a line 29a provided with a valve 30a, to a line 31 which extends the delivery port of the blower 23. The line 31 has a heater 32 and a branch 33, which is provided with a valve 34 and short-circuits the heater, and it also has a valve 35 between the heater and that part of the branch 33 Upstream of the latter. Likewise, the line 16b of the reactor 3b is connected, via a line 26b provided with a valve 27b, to the line 28 for discharging the purified residual gas and, on the other hand, via a line 29b provided with a valve 30b, to the line 31, at a point on the latter located between the branch 33 and the line 29a. A line 36 provided with an adjustable-flow valve 37 is mounted as a branch on the line 22, between the sulphur condenser 24 and the blower 23, and constitutes a line for feeding a make-up gas, while a line 38 provided with an adjustable-flow valve 39 is mounted as a branch on the line 31 between the blower 23 and the junction of the branch 33 with the line 31 upstream of the valve 35 and constitutes a purge line.

Figure 2:
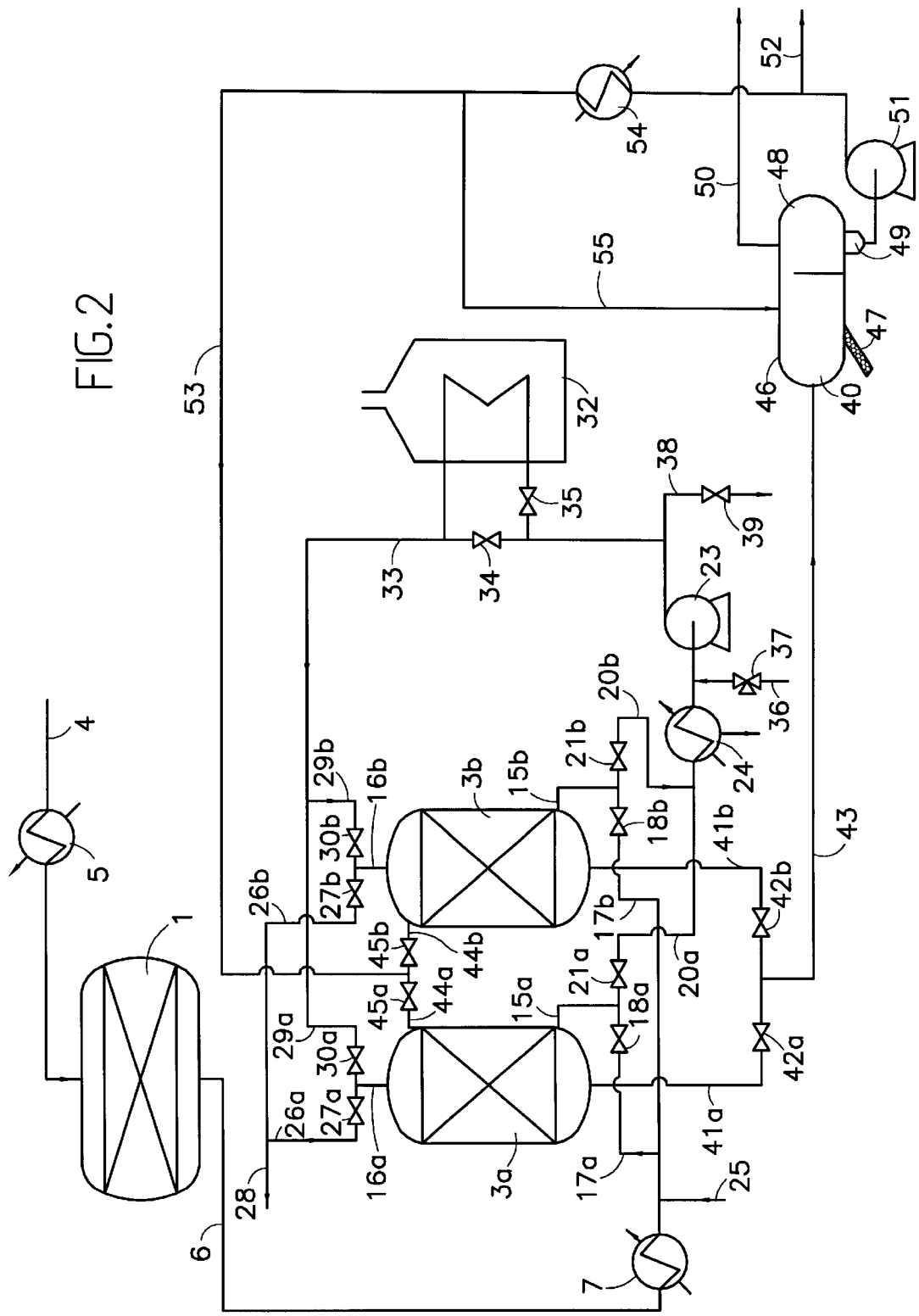
FIG. 2 shows another embodiment of an apparatus used in connection with the invention in which the $H_2S$-to-sulphur oxidation is carried out in a reactor of the trickle-bed reactor type.

The apparatus shown in FIG. 2 combines a hydrogenation and hydrolysis reactor 1, two catalytic oxidation reactors 3a and 3b, the catalytic oxidation reactors being mounted in parallel and each containing a bed of an $H_2S$-to-sulphur oxidation catalyst, and a water-injection cooling system which includes a tank 40 operating as a settler and gas/liquid separator. The reactor 1 has, on the one hand, a line 4 for feeding the residual gas to be treated, coming from a sulphur plant or from a treatment unit, for example a SULFREEN unit, producing a residual gas of comparable composition, in which line a heater 5 is inserted, and, on the other hand, a gas discharge line 6 connected to the inlet of an indirect heat exchanger 7 operating as a cooler.

The catalytic oxidation reactors 3a and 3b are provided with a first line, respectively 15a and 15b and with a second line, respectively 16a and 16b, these lines being located on either side of the catalytic bed present in each of the reactors. The line 15a of the reactor 3a is connected, on the one hand, via a line 17a provided with a valve 18a, to a line 19 connected to the outlet of the indirect heat exchanger 7 and, on the other hand, via a line 20a provided with a valve 21a, to a line 22 which is itself connected to the intake port of a blower 23 and on which is mounted a sulphur condenser 24. Likewise, the line 15b of the reactor 3b is connected, on the one hand, via a line 17b provided with a valve 18b, to the line 19, downstream of the junction of the line 17a with the said line 19, and, on the other hand, via a line 20b provided with a valve 21b, to the line 22 at a point on the latter located between the line 20a and the sulphur condenser 24. Upstream of its connection with the line 17a, the line 19 has, as a branch, an inlet 25 for the addition of a gas containing free oxygen.

The line 16a of the reactor 3a is connected, on the one hand, via a line 26a provided with a valve 27a, to a line 28 for discharging the purified residual gas into an incineration reactor (not shown) and from there into the atmosphere and, on the other hand, via a line 29a provided with a valve 30a, to a line 31 which extends the delivery port of the blower 23. The line 31 has a heater 32 and a branch 33, which branch is provided with a valve 34 and short-circuits the heater, and it has also a valve 35 between the heater and the part of the branch 33 upstream of the latter. Likewise, the line 16b of the reactor 3b is connected, via a line 26b provided with a valve 27b, to the line 28 for discharging the purified residual gas and, on the other hand, via a line 29b provided with a valve 30b, to the line 31, at a point on the latter located between the branch 33 and the line 29a. A line 36 provided with an adjustable-flow valve 37 is mounted as a branch on the line 22, between the sulphur condenser 24 and the blower 23, and constitutes a line for feeding a make-up gas, while a line 38 provided with an adjustable-flow valve 39 is mounted as a branch on the line 31 between the blower 23 and the junction of the branch 33 with the line 31 upstream of the valve 35 and constitutes a purge line.

The catalytic oxidation reactors 3a and 3b are also provided, at the bottom, with a withdrawal line, respectively 41a and 41b, provided with a valve, respectively 42a and 42b, which is connected, via a liquid discharge line 43, to the inlet of the settler and gas/liquid separator tank 40 and, in their upper part, with a liquid injection line, respectively 44a and 44b, provided with a valve, respectively 45a and 45b. The withdrawal line and the liquid injection line with which each of the catalytic oxidation reactors 3a and 3b are equipped are also located on either side of the catalytic bed present in the reactor in question. The tank 40 has a settling zone 46, which is provided in its lower part with a system 47 for extracting solids, and a gas/liquid separation zone 48 which has, in its lower part, an outlet 49 for the liquids and, in its upper part, an outlet 50 for the gases. The outlet 49 of the tank 40 is connected to the intake of a pump 51, the delivery port of which is extended by a liquid discharge line 52. A line 53, which is mounted as a branch on the line 52 and in which an indirect heat exchanger 54 operating as a cooler is inserted, is connected to the liquid injection line, respectively 44a and 44b, with which each of the catalytic oxidation reactors 3a and 3b is provided. A line 55, mounted as a branch on the line 53 between the heat exchanger 54 and the junction of the line 53 with the lines 44a and 44b, also connects the line 53 to the settling zone 46 of the tank 40.

Figure 3:
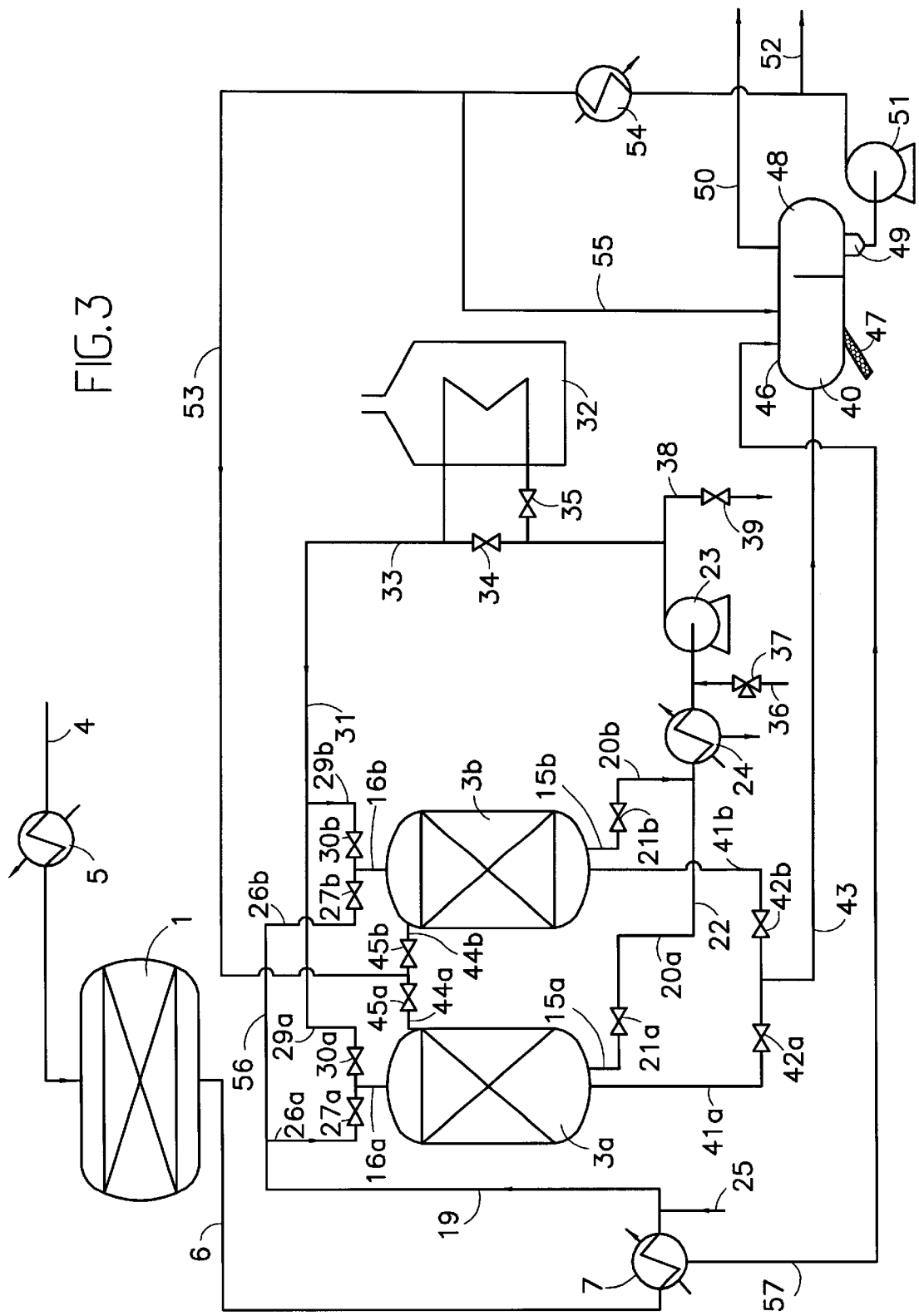
FIG. 3 shows still another embodiment of an apparatus used in connection with the invention in which the $H_2S$-to-sulphur oxidation is carried out in a reactor of the trickle-bed reactor type.

The apparatus shown in FIG. 3 combines a hydrogenation and hydrolysis reactor 1, two catalytic oxidation reactors 3a and 3b, the catalytic oxidation reactors being mounted in parallel and each containing a bed of an $H_2S$-to-sulphur oxidation catalyst, and a water-injection cooling system which includes a tank 40 operating as a settler and a gas/liquid separator. The reactor 1 has, on the one hand, a line 4 for feeding residual gas to be treated, coming from a sulphur plant or from a treatment unit, for example a SULFREEN unit, producing a residual gas of comparable composition, in which a heater 5 is inserted, and, on the other hand, a gas discharge line 6 connected to the inlet of an indirect heat exchanger 7 operating as a cooler.

The catalytic oxidation reactors 3a and 3b are provided with a first line, respectively 15a and 15b, and with a second line, respectively 16a and 16b, these lines being located on either side of the catalytic bed present in each of the reactors. The line 15a of the reactor 3a is connected, via a line 20a provided with a valve 21a, to a line 22 which is itself connected to the intake port of a blower 23 and on which is mounted a sulphur condenser 24. Likewise, the line 15b of the reactor 3b is connected, via a line 20b provided with a valve 21b, to the line 22 at a point on the latter located between the line 20a and the sulphur condenser 24.

The line 16a of the reactor 3a is connected, on the one hand, via a line 26a provided with a valve 27a, to a gas feed line 56 and, on the other hand, via a line 29a provided with a valve 30a, to a line 31 which extends the delivery port of the blower 23. The line 31 has a heater 32 and a branch 33, which branch is provided with a valve 34 and short-circuits the heater, and it also has a valve 35 between the heater and the part of the branch 33 upstream of the latter. Likewise, the line 16b of the reactor 3b is connected, via a line 26b provided with a valve 27b, to the gas feed line 56 and, on the other hand, via a line 29b provided with a valve 30b, to the line 31, at a point on the latter located between the branch 33 and the line 29a. A line 36 provided with an adjustable-flow valve 37 is mounted as a branch on the line 22, between the sulphur condenser 24 and the blower 23, and constitutes a line for feeding a make-up gas, while a line 38 provided with an adjustable-flow valve 39 is mounted as a branch on the line 31 between the blower 23 and the junction of the branch 33 with the line 31 upstream of the valve and constitutes a purge line.

The catalytic oxidation reactors 3a and 3b are also provided, at the bottom, with a withdrawal line, respectively 41a and 41b, provided with a valve, respectively 42a and 42b, which is connected via a liquid discharge line 43 to the inlet of the settler and gas/liquid separator tank 40 and, in their upper part, with a liquid injection line, respectively 44a and 44b, provided with a valve, respectively 45a and 45b. The withdrawal line and the liquid injection line with which each of the catalytic oxidation reactors 3a and 3b are equipped are also located on either side of the catalytic bed present in the reactor in question. The tank 40 has a settling zone 46, which is provided, in its lower part, with a system 47 for extracting solids, and a gas/liquid separation zone 48 which has, in its lower part, an outlet 49 for the liquids and, in its upper part, an outlet line 50 for discharging the purified residual gas into an incineration reactor (not shown) and from there into the atmosphere. The outlet 49 of the tank 40 is connected to the intake of a pump 51, the delivery port of which is extended by a liquid discharge line 52. A line 53, which is mounted as a branch on the line 52 and in which an indirect heat exchanger 54 operating as a cooler is inserted, is connected to the liquid injection line, respectively 44a and 44b, with which each of the catalytic oxidation reactors 3a and 3b is provided. A line 55, mounted as a branch on the line 53 between the heat exchanger 54 and the junction of the line 53 with the lines 44a and 44b, also connects the line 53 to the settling zone 46 of the tank 40. The gas feed line 56 is connected via a line 19 to the outlet of the heat exchanger 7. Furthermore, the heat exchanger has a discharge port for the condensed liquids, which discharge port is connected via a line 57 to the settling zone 46 of the tank 40. Upstream of its connection to the line 57, the line 19 has, as a branch, an inlet 25 for the addition of a gas containing free oxygen.

The process of treating the residual gas in the apparatuses which have just been described may be indicated schematically as follows:

Referring to the apparatus in FIG. 1, it is assumed that the reactor 3a is in the catalytic oxidation phase while the reactor 3b is in the regeneration phase, the valves 18a, 21b, 27a, 30b and 35 being open while the valves 18b, 21a, 27b, 30a and 34 are closed.

The residual gas, coming from the sulphur plant via the line 4, passes through the heat exchanger 5 where it is heated to the temperature required for the hydrogenation, for example between 200° C. and 400° C. The hot residual gas leaving the exchanger 5 passes through the hydrogenation and hydrolysis reactor 1 containing a suitable amount of a catalyst capable of promoting the hydrogenation of $SO_2$ and of elemental sulphur into $H_2S$ as well as the hydrolysis of the compounds COS and $CS_2$ into $H_2S$, the catalyst being, for example, based on cobalt and on molybdenum. For more details about the implementation of the phase for hydrogenating and hydrolysing the sulphur compounds present in the residual gas, reference may be made to the information contained in the citation WO-A-94/21359. In the reactor 1, the sulphur compounds other than $H_2S$ present in the residual gas are converted almost completely into $H_2S$. The gaseous effluent leaving the reactor 1 via the line 6, the temperature of which reactor is about 280° C. to 450° C., then passes through the heat exchanger 7 for the purposes of cooling the gaseous effluent before it enters the scrubbing tower 2 via the port 8. In this tower, the cooled hydrogenated gaseous effluent is scrubbed by water continuously sprayed by the line 9, in order to condense most of the water vapour that it contains. A stream of water is continuously withdrawn via the line 11, which stream of water is discharged by the pump 13 and the line 14 into a sour-water storage tank, after the fraction of the stream of water which is required, after cooling in the heat exchanger 10, for spraying the water introduced into the scrubbing tower has been tapped off in the line 9. Leaving from the top of the scrubbing tower 2 is a cooled gaseous effluent containing less than approximately 10% of water vapour by volume, which effluent, the temperature of which is between 35° C. and 70° C., is brought into the oxidation reactor 3a via the lines 12 and 19, the line 17a, through the valve 18a, and the line 15a, after having received, via the line 25, a controlled amount of a gas containing free oxygen, and especially of air, in order to oxidize the $H_2S$ to sulphur.

In the reactor 3a, which just like the reactor 3b contains an $H_2S$-to-sulphur oxidation catalyst according to the invention, the $H_2S$ is selectively oxidized to sulphur by oxygen in contact with the oxidation catalyst according to the reaction:

$$H_2S + \tfrac{1}{2}O_2 \rightarrow S + H_2O.$$

The oxidation is carried out adiabatically between 35° C. and 70° C. and more especially within the 40° C. to 65° C. range, the sulphur formed by the oxidation being deposited on the oxidation catalyst. A purified residual gas having an extremely small residual $H_2S$ content, leaves the reactor 3a via the line 16a, which gas is sent by the line 26a, through the valve 27a, into the discharge line 28 which conveys the purified residual gas into a thermal or catalytic incineration reactor (not shown).

A stream of non-oxidizing flushing gas is sent by the blower 23 into the line 31 through the valve 35 and the heater 32, in which this gas stream is heated to the temperature suitable for regeneration, which is generally between 200° C. and 500° C. and more especially between 230° C. and 400° C. The stream of heated gas circulating in the line 31 is introduced into the reactor 3b via the line 29b, through the valve 30b and the line 16b, and flushes the sulphur-laden oxidation catalyst contained in the reactor. The flushing gas stream, entraining the vaporized sulphur, leaves the reactor 3b via the line 15b and flows via the line 20b, through the valve 21b, and the line 22 as far as the sulphur condenser 24 in which most of the sulphur is separated by condensation. On the outlet side of the sulphur condenser 24, the flushing gas stream is taken up by the blower 23 and delivered into the line 31, as indicated above.

After a sufficient time of flushing the catalyst contained in the reactor 3b by the flushing gas passing through the heater 32, in order to completely remove the sulphur deposited on the catalyst, the valve 34 is opened and the valve 35 is closed so as to short-circuit the heater 32 and to lower the temperature of the flushing gas, and the flushing is continued for a suitable time in order to cool the regenerated catalyst contained in the reactor 3b to a suitable temperature allowing the catalyst to be brought into contact with the two-phase stream passing through the line 19 downstream of the inlet 25.

During the cooling of the regenerated catalyst, when the temperature of the catalyst reaches values of less than 250° C. and more especially between 30° C. and 200° C., an oxygenated gas stream, consisting of an inert carrier gas containing 0.1% to 3% and more especially 0.3 to 1.5% oxygen and 0% to 50% and more especially 0.5% to 30% water by volume, the gas having a temperature of less than 250° C. and more especially between 30° C. and 200° C., is introduced into the flushing gas via the line 36 through the valve 37 and the injection of the oxygenated gas stream is maintained for a time of between 0.2 and 3 hours and more especially between 0.5 and 2 hours so as to restore the oxysulphide active phase of the oxidation catalyst.

When the catalyst has been cooled to the temperature required and its active phase has been restored, the roles played by the reactors 3a and 3b are switched over, that is to say the reactor 3b is brought into the oxidation reaction phase and the reactor 3a into the regeneration/cooling phase. To do this, the valves 30b and 21b are closed, then the valves 18b and 27b are opened and then the valves 18a and 27a are closed, this having the result that the reactor 3b is brought into the reaction phase. Finally, the valves 30a and 21a are opened in order to circulate the hot regeneration gas in the reactor 3a, which then operates in regeneration phase. After a sufficient regeneration time, the reactor 3a is then passed into the cooling phase with restoration of the active phase of the catalyst as indicated above with regard to the reactor 3b.

Referring to the apparatus in FIG. 2, it is assumed that the reactor 3a is in the catalytic oxidation phase while the reactor 3b is in the regeneration phase, the valves 18a, 21b, 27a, 30b, 35, 42a and 45a being open, while the valves 18b, 21a, 27b, 30a, 34, 42b and 45b are closed.

The residual gas coming from the sulphur plant via the line 4 passes through the heat exchanger 5, the hydrogenation and hydrolysis reactor 1 and the heat exchanger 7, where it is treated as indicated with reference to FIG. 1. The heat exchanger produces a gas/condensed water two-phase effluent, the temperature of which is between 35° C. and 70° C. and which is brought into the oxidation reactor 3a via the line 19, the line 17a, through the valve 18a, and the line 15a, after having received, via the line 25, a controlled amount of gas containing free oxygen, and especially air, in order to oxidize the $H_2S$ to sulphur.

A stream of cooling water brought by the line 53 is continuously introduced into the reactor 3a via the line 44a through the valve 45a, the stream of water circulating in the reactor 3a as a countercurrent with respect to the gas contained in the two-phase effluent injected into the reactor via the line 15a and leaving this reactor, via the line 41a through the valve 42a, laden with solid sulphur particles in order to be introduced, via the line 43, into the settling zone 46 of the tank 40. In this zone 46, the solid sulphur particles which are contained in the stream of water brought by the line 43 collect in the lower part of the zone, from which they are discharged in the form of an aqueous suspension by the extraction system 47. The water stripped of the sulphur particles then passes into the gas/liquid separation zone 48 of the tank 40, in which zone the water is degassed, the separated gas being discharged via the line 50. At the bottom of the zone 48, a stream of water is continuously withdrawn via the line 49 and discharged, by means of the pump 51, via the line 52 into a sour-water storage tank, after a fraction of the discharged stream of water has been tapped off in the line 53. The fraction of water thus tapped off is cooled in the heat exchanger 54 and a portion of the cooled fraction of water is used to constitute the stream of cooling water introduced into the reactor 3a, for the purposes of controlling the temperature in the reactor, while the rest of the fraction of water is returned via the line 55 into the zone 46 of the tank 40.

In the reactor 3a, which just like the reactor 3b contains a catalyst according to the invention for the oxidation of $H_2S$ to sulphur, the $H_2S$ is selectively oxidized to sulphur by oxygen in contact with the oxidation catalyst according to the reaction:

$$H_2S + \tfrac{1}{2}O_2 \rightarrow S + H_2O.$$

At the temperatures, maintained between 35° C. and 70° C. and more especially within the 40° C. to 65° C. range by the aforementioned water injection, which are used for carrying out the oxidation, the sulphur formed by the oxidation is deposited on the catalyst. A purified residual gas having an extremely low residual $H_2S$ content leaves the reactor 3a via the line 16a, which gas is sent via the line 26a, through the valve 27a, into the discharge line 28 which conveys the said purified residual gas into a thermal or catalytic incineration reactor (not shown).

A stream of a non-oxidizing flushing gas is sent by the blower 23 into the line 31 through the valve 35 and the heater 32, in which this gas stream is heated to the temperature suitable for regeneration, as indicated with reference to FIG. 1. The stream of heated gas circulating in the line 31 is introduced into the reactor 3b via the line 29b, through the valve 30b and the line 16b, and flushes the sulphur-laden oxidation catalyst contained in the reactor. The stream of flushing gas, entraining the vaporized sulphur, leaves the reactor 3b via the line 15b and flows via the line 20b, through the valve 21b, and the line 22 as far as the sulphur condenser 24 in which most of the sulphur is separated by condensation. On the output side of the sulphur condenser 24, the stream of flushing gas is taken up by the blower 23 and delivered into the line 31, as indicated above.

After a sufficient time of flushing the catalyst contained in the reactor 3b with the flushing gas passing through the heater 32 in order to completely remove the sulphur deposited on the catalyst, the valve 34 is opened and the valve 35 is closed so as to short-circuit the heater 32 and to lower the temperature of the flushing gas, and the flushing is continued for a suitable time in order to cool the regenerated catalyst contained in the reactor 3b to a suitable temperature allowing the catalyst to be brought into contact with the two-phase stream passing through the line 19 downstream of the inlet 25.

During the cooling of the regenerated catalyst, when the temperature of the catalyst reaches values of less than 250° C. and more especially of between 30° C. and 200° C., the oxysulphide catalytic phase of the regenerated catalyst is restored by carrying out the process as described with reference to FIG. 1.

When the said catalyst has been cooled to the required temperature and its active phase has been restored, the roles played by the reactors 3a and 3b are switched over, that is to say the reactor 3b is brought into the oxidation reaction phase and the reactor 3a into the regeneration/cooling phase. To do this, the valves 30b and 21b are closed, then the valves 18b, 27b, 42b and 45b are opened and then the valves 18a, 27a, 42a and 45a are closed, this having the result of bringing the reactor 3b into the reaction phase. Finally, the valves 30a and 21a are opened in order to circulate the hot regeneration gas into the reactor 3a, which then operates in regeneration phase. After a sufficient regeneration time, the reactor 3a is then passed into the cooling phase with restoration of the active phase of the catalyst as indicated above with regard to FIG. 3b.

Referring to the apparatus in FIG. 3, it is assumed that the reactor 3a is in the catalytic oxidation phase while the reactor 3b is in the regeneration phase, the valves 21b, 27a, 30b, 35, 42a and 45a being open while the valves 21a, 27b, 30a, 34, 42b and 45b are closed.

The residual gas coming from the sulphur plant via the line 4 passes through the heat exchanger 5, the hydrogenation and hydrolysis reactor 1 and the heat exchanger 7, where it is treated as indicated with reference to FIG. 1. The said heat exchanger produces condensed water which is brought, via the line 57, into the settling zone 46 of the tank 40, and a gas/condensed water two-phase effluent, the temperature of which is between 35° C. and 70° C. and which is brought into the oxidation reactor 3a via the line 19, the line 56, the line 26a, through the valve 27a, and the line 16a, after having received, via the line 25, a controlled amount of a gas containing free oxygen, and especially air, in order to oxidize the $H_2S$ to sulphur.

A stream of cooling water brought by the line 53 is continuously introduced in the reactor 3a via the line 44a, through the valve 45a, the stream of water circulating in the reactor 3a as a cocurrent with respect to the gas contained in the two-phase effluent injected into the reactor via the line 16a.

In the reactor 3a, which just like the reactor 3b contains a catalyst according to the invention for the oxidation of $H_2S$ to sulphur, the $H_2S$ is selectively oxidized to sulphur by oxygen in contact with the oxidation catalyst according to the reaction:

$$H_2S + \tfrac{1}{2}O_2 \rightarrow S + H_2O.$$

At the temperatures, maintained between 35° C. and 70° C. and more especially within the 40° C. to 65° C. range by the aforementioned water injection, which are used for bringing about the oxidation, the sulphur formed by the oxidation is deposited on the said catalyst.

A water/purified gas two-phase mixture, laden with solid sulphur particles, leaves the reactor 3a via the line 41a through the valve 42a, in order to be introduced, via the line 43, into the settling zone 46 of the tank 40. In this zone 46, the solid sulphur particles, which are contained in the water/purified gas two-phase mixture brought by the line 43, collect in the lower part of the zone, from which they are discharged in the form of an aqueous suspension via the extraction system 47. The two-phase mixture stripped of the sulphur particles then passes into the gas/liquid separation zone 48 of the tank 40, in which zone the water is separated from the purified gas, the purified gas then being discharged via the line 50 into a thermal or catalytic incineration reactor (not shown). At the bottom of the zone 48, a stream of water is continuously withdrawn via the line 49 and discharged, by means of the pump 51, via the line 52 into a sour-water storage tank, after a fraction of the discharged stream of water has been tapped off in the line 53. The fraction of water thus tapped off is cooled in the heat exchanger 54 and a portion of the cooled fraction of water is used to constitute the stream of cooling water introduced into the reactor 3a for the purposes of controlling the temperature of the reactor, while the rest of the fraction of water is returned via the line 55 into the zone 46 of the tank 40.

A non-oxidizing stream of flushing gas is sent via the blower 23 into the line 31 through the valve 35 and the heater 32, in which this gas stream is heated to the appropriate temperature for regeneration, as indicated with reference to FIG. 1. The stream of heated gas circulating in the line 31 is introduced into the reactor 3b via the line 29b, through the valve 30b and the line 16b, and flushes the sulphur-laden oxidation catalyst contained in the reactor. The stream of flushing gas, entraining the vaporized sulphur, leaves the reactor 3b via the line 15b and flows via the line 20b, through the valve 21b, and the line 22 as far as the sulphur condenser 24 in which most of the sulphur is separated by condensation. On the output side of the sulphur condenser 24, the stream of flushing gas is taken up by the blower 23 and deliver into the line 31, as indicated above.

After a sufficient time of flushing the catalyst contained in the reactor 3b with the flushing gas passing through the heater 32, in order to completely remove the sulphur deposited on the catalyst, the valve 34 is opened and the valve 35 is closed so as to short-circuit the heater 32 and to lower the temperature of the flushing gas, and the flushing is continued for a suitable time in order to cool the regenerated catalyst contained in the reactor 3b to a suitable temperature allowing the catalyst to be brought into contact with the two-phase stream passing through the line 19, and then through the line 56, downstream of the inlet 25.

During the cooling of the regenerated catalyst, when the temperature of the catalyst reaches values of less than 250° C. and more especially of between 30° C. and 200° C., the oxysulphide catalytic phase of the regenerated catalyst is restored by carrying out the process as described with reference to FIG. 1.

When the catalyst has been cooled to the required temperature and its active phase has been restored, the roles played by the reactors 3a and 3b are switched over, that is to say the reactor 3b is brought into the oxidation reaction phase and the reactor 3a into the regeneration/cooling phase. To do this, the valves 29b and 21b are closed, then the valves 27b, 42b and 45b are opened and then the valves 27a, 42a and 45a are closed, this having the result of bringing the reactor 3b into the reaction phase. Finally, the valves 30a and 21a are opened in order to circulate the hot regeneration gas into the reactor 3a, which then operates in the regeneration phase. After a sufficient regeneration time, the reactor 3a is then passed into the cooling phase with restoration of the active phase of the catalyst as indicated above with regard to the reactor 3b.

In order to complete the above description, a series of examples illustrating the invention in a non-limiting manner will be given below.

EXAMPLE 1

A residual gas effluent containing, by volume, 0.8% $H_2S$ as the sole sulphur compound was treated, the said residual gaseous effluent being obtained by hydrogenation/hydrolysis of a residual gas from a Claus sulphur plant in which a sour gas containing 70% $H_2S$ by volume was treated.

The treatment of the gaseous effluent was carried out at a temperature below the dew point of the sulphur formed by oxidation of the said $H_2S$ and by using a catalyst consisting of silicon carbide supporting an active phase comprising nickel in the oxysulphide form, the catalyst having a BET specific surface area of 23 $m^2/g$ and containing 5% nickel by weight.

The catalyst was obtained by carrying out the following process. Microporous silicon carbide particles, having an average diameter of 1 mm and a BET specific surface area of 25 $m^2/g$, were impregnated with a suitable amount of nickel nitrate in aqueous solution, and then the impregnated product was dried at 100° C. and the dried product calcined at 300° C. for 3 hours. Next, the calcined product was sulphurized by bringing it into contact, at a temperature of 300° C. and for a time of 1 hour, with a stream of nitrogen containing 0.8% $H_2S$ by volume and, finally, the sulphurized product was subjected to an oxidizing treatment by bringing it into contact, at a temperature of 150° C. for 1 hour, with a gas stream consisting of 94.2% nitrogen, 0.8% oxygen and 5% water vapour by volume, in order to form the catalyst having a nickel oxysulphide active phase.

The treatment of the residual gas was carried out in a plant consisting of two catalytic oxidation reactors mounted in parallel, each reactor having an inlet and an outlet separated by a fixed bed of the aforementioned catalyst. Furthermore, the reactors were arranged in such a way that, alternately, one of the reactors was operating in the reaction phase, that is to say it had its inlet connected to a gas feed line on which an air injection tap was mounted and had its outlet connected to a gas discharge line, and the other reactor was operating in the regeneration/cooling phase, that is to say it was placed in a regeneration/cooling circuit equipped with means for ensuring the circulation of a flushing gas through the oxidation reactor from a heater as far as a sulphur condenser and return to the heater, and for then making a cooling gas circulate through the reactor that had been regenerated. Such a plan was similar to that part of the plant in FIG. 1 downstream of the line 12.

The gaseous effluent to be treated arrived via the gas feed line with a flow rate of 100 kmol/h and a temperature of 120° C. and, via the tap, 8.4 kmol of ambient air were added. The mixture obtained, in which the $O_2/H_2S$ molar ratio was equal to 2.1/1 (4.2 times the stoichiometric ratio) entered the reactor in oxidation phase with a temperature of approximately 120° C. The oxidation reaction in the reactor in reaction phase was carried out at 120° C., maintaining the reactor at this temperature by indirect heat exchange with a fluid at a suitable temperature. The time during which the gas mixture passing through the reactor in reaction phase is in contact with the catalyst layer contained in the reactor was equal to 4.3 seconds. The degree of conversion of the $H_2S$ in the reactor in oxidation reaction phase was 100%. On the output side of the reactor, a gas stream having a temperature of 120° C. and containing less than 150 vpm of $SO_2$ was discharged.

A flushing gas was injected into the reactor operating in regeneration/cooling phase, for the purposes of regenerating the sulphur-laden oxidation catalyst, the flushing gas consisting of nitrogen and being injected into the reactor with a temperature of approximately 300° C. and a flow rate of 1000 $Sm^3/h$. At the end of the catalyst regeneration phase, during which all the sulphur deposited on the catalyst was collected, the temperature of the flushing gas was lowered to 120° C. and the flushing continued with the cooled catalyst until the catalyst bed reached the temperature. At this stage, the regenerated and cooled catalyst was subjected to an oxidizing treatment consisting in making the regenerated and cooled catalyst come into contact, for 1 hour, with a gas stream having a flow rate of 1000 $Sm^3/h$ and a temperature of 120° C., and consisting of 94.2% nitrogen, 0.8% oxygen and 5% water vapour by volume, in order to form the catalyst with a nitrogen oxysulphide active phase containing 0.5% oxygen and 5% water vapour by volume, in order to reconstitute the nickel oxysulphide phase of the catalyst.

The oxidation reactors operated alternately for 24 hours in reaction phase and for 24 hours in regeneration/cooling phase, which included 9 hours of cooling and 1 hour of oxidizing treatment.

The degree of conversion of the $H_2S$ in the reactor in oxidation reaction phase was 100% right from the start and throughout each treatment cycle, this being so over a period of several months. The gas stream coming from the reactor in oxidation reaction phase had an $SO_2$ content which remained less than 150 vpm during each treatment cycle and it now contained virtually no $H_2S$, which corresponds to a sulphur selectivity of the catalyst of greater than 98% in each treatment cycle.

EXAMPLE 2

An $H_2S$-lean sour gas was treated, the gas consisting of 95.5% $CO_2$, 4% $H_2O$ and 0.5% $H_2S$ by volume.

The treatment of the sour gas was carried out at a temperature below the dew point of the sulphur formed by oxidation of the $H_2S$ in this sour gas by carrying out the process in a plant similar to that used in Example 1 and using a catalyst consisting of silicon carbide supporting an active phase comprising nickel in oxysulphide form, the said catalyst having a BET specific surface area of 22 $m^2/g$ and containing 3.6% nickel by weight.

The said catalyst was obtained by carrying out the following process.

Extruded particles of silicon carbide, having an average diameter of 2 mm and a length of 4 to 6 mm and having a BET specific surface area of 25 $m^2/g$, were impregnated with a suitable amount of nickel nitrate in aqueous solution, then the impregnated product was dried at 100° C. and the dried product calcined at 300° C. for 3 hours. Next, the calcined product was sulphurized by bringing it into contact, at a temperature of 300° C. and for 1 hour, with a stream of nitrogen containing 0.8% $H_2S$ by volume and, finally, the sulphurized product was brought into contact, at a temperature of 40° C. and for 1 hour, with a stream of gas consisting of 80.2% nitrogen, 19% water vapour and 0.8% oxygen by volume, in order to form the catalyst with a nickel oxysulphide active phase.

The gaseous effluent to be treated arrived via the gas feed line with a flow rate of 100 kmol/h and a temperature of 40° C. and, via the tap, 3.5 kmol of ambient air were added. The mixture obtained, in which the $O_2/H_2S$ molar ratio was 1.4/1 (2.8 times the stoichiometric ratio), entered the reactor in oxidation phase with a temperature of approximately 40° C. The oxidation reaction in the reactor in reaction phase was carried out at 40° C. by maintaining the reactor at this temperature by indirect heat exchange with a fluid at a suitable temperature. The time during which the gas mixture passing through the reactor in reaction phase is in contact with the catalyst layer contained in the reactor was 4 seconds. The degree of conversion of the $H_2S$ in the reactor in oxidation reaction phase was 100%. On the output side of the reactor, a gas stream having a temperature of 120° C. and being free of $H_2S$ and of $SO_2$ was discharged.

A flushing gas was injected into the reactor operating in regeneration/cooling phase, for the purposes of regenerating the sulphur-laden oxidation catalyst, the flushing gas consisting of nitrogen and being injected into the reactor with a temperature of approximately 300° C. and a flow rate of 1000 $Sm^3/h$. After the catalyst regeneration phase, during which all of the sulphur deposited on the catalyst was collected, the temperature of the flushing gas was lowered to 40° C. and the flushing continued with the cooled catalyst until the catalyst bed reached the said temperature. At this stage, the regenerated and cooled catalyst was then subjected to an oxidizing treatment consisting in making the regenerated and cooled catalyst come into contact, for 1 hour, with a gas stream having a temperature of 40° C. and consisting of 80.2% nitrogen, 19% water vapour and 0.8% oxygen by volume, in order to reconstitute the nickel oxysulphide phase of the catalyst.

The oxidation reactors operated, alternately, for 60 hours in reaction phase and for 24 hours in regeneration/cooling phase, which included 9 hours of cooling and 1 hour of oxidizing treatment.

The degree of conversion of the $H_2S$ in the reactor in oxidation reaction phase was 100% right from the start and throughout each treatment cycle, this being so over a period of several months. The gas stream coming from the reactor in oxidation reaction phase, during each treatment cycle, was free of $H_2S$ and of $SO_2$, which corresponds to a sulphur selectivity of the catalyst of 100% in each treatment cycle.

The implementation of the process according to the invention described above, in which a gas containing, in addition to $H_2S$, a relatively large amount of water, for example between 10% and 50% by volume, is treated by carrying out the catalytic oxidation on an oxysulphide-type catalyst at temperatures of between 35° C. and 70° C. and more particularly ranging from 40° C. to 65° C., with the temperature in the oxidation zone being maintained by injecting, into the zone, a stream of cooled water circulating as a cocurrent or as a countercurrent with respect to the gas to be treated, may be generalized to the use of any oxidation catalyst capable of promoting the selective oxidation of $H_2S$ to sulphur at temperatures of between 35° C. and 70° C.

This generalized implementation may be defined as a regenerative process for oxidizing, by a catalytic route, the $H_2S$ contained in low concentration in a gas which also contains 10% to 50% water by volume directly to sulphur, the process being of the type in which the $H_2S$-containing gas with a gas containing free oxygen in a suitable amount so as to give an $O_2/H_2S$ molar ratio ranging from 0.05 to 15, is made to come into contact with a catalyst for the selective oxidation of $H_2S$ to sulphur, for example a catalyst consisting of a catalytically active phase combined with a support, especially a silicon carbide support, and consisting of a compound of at least one transition metal, the process being carried out at temperatures below the dew point of the sulphur formed by the oxidation of the $H_2S$, which sulphur is deposited on the catalyst, the sulphur-laden oxidation catalyst is then periodically regenerated by flushing using a non-oxidizing gas, the process being carried out at temperatures of between 200° C. and 500° C. in order to vaporize the sulphur retained on the catalyst, and thereafter the regenerated catalyst is cooled down, below the dew point of the sulphur, to the temperature required for the $H_2S$ oxidation to be carried out again, this cooling being carried out by means of a gas having a temperature of less than 180° C., and being characterized in that the gas to be treated is brought into contact with the oxidation catalyst at a temperature of between 35° C. and 70° C. and more particularly ranging from 40° C. to 65° C., at which temperature a fraction of the water contained in the gas is present in condensed form and the gas to be treated is then in the form of a gas/condensed water mixed phase, and in that the oxidation zone is maintained at a temperature of between 35° C. and 70° C. and more particularly ranging from 40° C. to 65° C. by injecting, into the zone, a stream of cooled water circulating continuously as a countercurrent or as a cocurrent with respect to the gas to be treated.

When the gas to be treated, brought into contact with the $H_2S$ oxidation catalyst, circulates as a countercurrent with respect to the stream of cooled water injected into the oxidation zone, a purified gas substantially free of sulphur compounds is discharged from the top of the oxidation zone and a stream of water laden with solid sulphur particles is withdrawn from the bottom of this zone, and a portion of the stream of water, after separating the sulphur that it contains and cooling, is recycled in order to form the stream of cooling water injected into the oxidation zone.

When the gas to be treated, brought into contact with the $H_2S$ oxidation catalyst, circulates as a cocurrent with respect to the stream of cooled water injected into the oxidation zone, a purified gas/condensed water mixture, laden with solid sulphur particles, is withdrawn from the bottom of the oxidation zone, the mixture is separated into a stream of purified gas, which is discharged, and an aqueous phase, and a portion of this aqueous phase, after separating the sulphur that it contains and cooling, is recycled in order to constitute the stream of cooling water injected into the oxidation zone.

The other operating conditions for these generalized implementations, such as the nature and amount of the gas containing free oxygen, the time during which the gaseous reaction mixture is in contact with the oxidation catalyst, the conditions relating to the regeneration of the sulphur-laden catalyst and to the cooling of the regenerated catalyst, are those defined above in the case of the oxysulphide-type catalyst.

Likewise, the above description of the embodiments of the process according to the invention for the treatment of a gas having a low $H_2S$ content and a high water content, in the apparatuses shown diagrammatically in FIGS. 2 and 3 of the appended drawing, with the use of an $H_2S$-to-sulphur oxidation catalyst of the oxysulphide type, is applicable in the same manner when the $H_2S$-to-sulphur selective oxidation catalyst is no longer of the oxysulphide type.

What is claimed is:

1. A regenerative process for oxidizing $H_2S$ contained in low concentration in a gas directly to sulphur comprising:

combining the $H_2S$-containing gas with a gas containing free oxygen in an amount to form an $O_2$/$H_2S$-containing gas with an $O_2$/$H_2S$ molar ratio ranging from 0.05 to 15;

contacting the $O_2$/$H_2S$-containing gas with a catalyst for the selective oxidation of $H_2S$ to sulphur, wherein the catalyst comprises a catalytically active phase containing at least one oxysulphide of at least one metal selected from the group consisting of nickel, iron, cobalt, copper, chromium, molybdenum and tungsten combined with a silicon carbide support at temperatures below the dew point of the sulphur formed by oxidation of $H_2S$ and depositing the sulphur on the catalyst;

periodically regenerating by flushing the sulphur-laden catalyst using a non-oxidizing gas at temperatures of between 200° C. and 500° C. to vaporize sulphur retained on the catalyst;

cooling the regenerated catalyst below the dew point of the sulphur to a temperature for $H_2S$ oxidation to be carried out again, said cooling being carried out by a gas having a temperature less than 180° C.

2. The process according to claim 1, wherein the $H_2S$-to-sulphur oxidation reaction is carried out at temperatures of between 30° C. and 180° C.

3. The process according to claim 1, wherein the $H_2S$-to-sulphur oxidation reaction is carried out at temperatures of between 35° C. and 70° C.

4. The process according to claim 3, wherein the $H_2S$-containing gas is brought into contact with the oxidation catalyst at a temperature less than or equal to the temperature of the $H_2S$-to-sulphur oxidation reaction.

5. The process according to claim 3, wherein the gas to be treated has a temperature greater than 70° C. and contains 10% to 50% water by volume and the gas is cooled to a temperature for oxidation between 35° C. and 70° C. before it is brought into contact with the $H_2S$-to-sulphur oxidation catalyst, and wherein a fraction of water condenses during the cooling.

6. The process according to claim 5, wherein cooling the gas to be treated is carried out so that the cooled gas has a water-vapour content of less than approximately 10% by volume, and wherein condensed water is separated from the cooled gas before the cooled gas is brought into contact with the $H_2S$ oxidation catalyst.

7. The process according to claim 5, wherein water condensed during cooling of the gas to be treated is not separated from the cooled gas and a gas/condensed water mixed phase is brought into contact with the $H_2S$ oxidation catalyst, the temperature in the oxidation zone is maintained between 35° C. and 70° C. by injecting, into the zone, a stream of cooled water circulating continuously and countercurrently with respect to the gas to be treated, a purified gas substantially free of sulphur compounds is discharged from the top of the oxidation zone and a stream of water laden with solid sulphur particles is withdrawn from the bottom of the zone, and a portion of the stream of water is recycled, after separating the sulphur that it contains and cooling, to form the stream of cooling water injected into the oxidation zone.

8. The process according to claim 5, wherein water condensed during cooling of the gas to be treated is not separated from the cooled gas and a gas/condensed water mixed phase is brought into contact with the $H_2S$ oxidation catalyst, the temperature in the oxidation zone is maintained between 35° C. and 70° C. by injecting, into the zone, a stream of cooled water circulating continuously as cocurrently with respect to the gas to be treated, a purified gas/condensed water mixture, laden with solid sulphur particles, is withdrawn from the bottom of the oxidation zone, the mixture is separated into a stream of purified gas, which is discharged, and an aqueous phase and a portion of this aqueous phase, after separating the sulphur that it contains and cooling, is recycled to form the stream of cooling water injected into the oxidation zone.

9. The process according to claim 5, wherein water condensed during cooling of the gas to be treated is not separated from the cooled gas and a gas/condensed water mixed phase is brought into contact with the $H_2S$ oxidation catalyst, the temperature in the oxidation zone is maintained between 40° C. and 65° C. by injecting, into the zone, a stream of cooled water circulating continuously and countercurrently with respect to the gas to be treated, a purified gas substantially free of sulphur compounds is discharged from the top of the oxidation zone and a stream of water laden with solid sulphur particles is withdrawn from the bottom of the zone, and a portion of the stream of water is recycled, after separating the sulphur that it contains and cooling, to form the stream of cooling water injected into the oxidation zone.

10. The process according to claim 5, wherein water condensed during cooling of the gas to be treated is not separated from the cooled gas and a gas/condensed water mixed phase is brought into contact with the $H_2S$ oxidation catalyst, the temperature in the oxidation zone is maintained between 40° C. and 65° C. by injecting, into the zone, a stream of cooled water circulating continuously and cocurrently with respect to the gas to be treated, a purified gas/condensed water mixture, laden with solid sulphur particles, is withdrawn from the bottom of the oxidation zone, the mixture is separated into a stream of purified gas, which is discharged, and an aqueous phase and a portion of this aqueous phase, after separating the sulphur that it contains and cooling, is recycled to form the stream of cooling water injected into the oxidation zone.

11. The process according to claim 3, wherein the gas to be treated has a temperature greater than 70° C. and contains 10% to 50% water by volume and the gas is cooled to a temperature for oxidation between 40° C. and 65° C. before it is brought into contact with the $H_2S$-to-sulphur oxidation catalyst, and wherein a fraction of water condenses during the cooling.

12. The process according to claim 1, wherein the active phase consists of at least one oxysulphide of a transition metal selected from the group consisting of nickel, cobalt, iron and copper.

13. The process according to claim 1, wherein the silicon carbide support of the oxidation catalyst forms at least 40% by weight of the catalyst.

14. The process according to claim 1, wherein the active phase of the oxidation catalyst represents, in terms of weight of metal, 0.1 to 20% of the weight of the catalyst.

15. The process according to claim 1, wherein the specific surface area of the catalyst, determined by the BET nitrogen adsorption method, has values ranging from 0.1 $m^2/g$ to 600 $m^2/g$.

16. The process according to claim 1, wherein the gas containing free oxygen is used in an amount to provide an $O_2/H_2S$ molar ratio ranging from 0.1 to 10.

17. The process according to claim 1, wherein the times during which the gaseous reaction mixture is in contact with the oxidation catalyst, under standard temperature and pressure conditions, range from 0.5 to 20 seconds.

18. The process according to claim 1, wherein regeneration of the sulphur-laden oxidation catalyst is carried out at temperatures of between 230 and 450° C.

19. The process according to claim 1, wherein the $H_2S$ content of the gas to be treated is between 0.001% and 25% by volume.

20. The process according to claim 1, wherein the $H_2S$ to sulphur oxidation reaction is carried out at temperatures of between 40° C. and 65° C.

21. The process according to claim 20, wherein the $H_2S$-containing gas is brought into contact with the oxidation catalyst at a temperature less than or equal to the temperature of the $H_2S$ to sulphur oxidation reaction.

22. The process according to claim 1, wherein the silicon carbide support of the oxidation catalyst forms at least 50% by weight of the catalyst.

23. The process according to claim 1, wherein the active phase of the oxidation catalyst represents, in terms of weight of metal, 0.2 to 15% of the weight of the catalyst.

24. The process according to claim 1, wherein the active phase of the oxidation catalyst represents, in terms of weight of metal, 0.2 to 7% of the weight of the catalyst.

25. The process according to claim 1, wherein the gas containing free oxygen is used in an amount to provide an $O_2/H_2S$ molar ratio ranging from 0.1 to 4.

26. The process according to claim 1, wherein the times during which the gaseous reaction mixture is in contact with the oxidation catalyst, under standard temperature and pressure conditions, range from 1 to 12 seconds.

27. The process according to claim 1, wherein the $H_2S$ content of the gas to be treated is between 0.01% and 20% by volume.

28. A process for oxidizing $H_2S$ contained in low concentration in a gas directly to sulphur comprising:
   combining the $H_2S$-containing gas with a gas containing free oxygen in an amount to form an $O_2/H_2S$-containing gas with an $O_2/H_2S$ molar ratio ranging from 0.05 to 15;
   contacting the $O_2/H_2S$-containing gas with a catalyst for the selective oxidation of $H_2S$ to sulphur, wherein the catalyst comprises a catalytically active phase containing at least one oxysulphide of at least one metal selected from the group consisting of nickel, iron, cobalt, copper, chromium, molybdenum and tungsten combined with a silicon carbide support at temperatures below the dew point of the sulphur formed by oxidation of $H_2S$ and depositing the sulphur on the catalyst;
   periodically regenerating by flushing the sulphur-laden catalyst using a non-oxidizing gas at temperatures of between 200° C. and 500° C. to vaporize sulphur retained on the catalyst;
   cooling the regenerated catalyst below the dew point of the sulphur to a temperature for $H_2S$ oxidation to be carried out again, such cooling being carried out by a gas having a temperature less than 180° C.; and
   contacting the regenerated catalyst at temperatures of less than 250° C. and for a time of between 0.2 and 3 hours, with an oxygenated gas stream consisting of an inert carrier gas containing 0.1% to 3% oxygen and 0% to 50% water by volume, to restore the metal oxysulphide phase of the catalyst.

29. A regenerative process for directly oxidizing to sulphur $H_2S$ contained in low concentration in a gas also containing 10% to 50% water by volume, a fraction of this water being in condensed form and forming with the gas a gas/condensed water mixed phrase, comprising:
   combining the $H_2S$-containing mixed phase with a gas containing free oxygen in an amount to form an $O_2/H_2S$-containing mixed phase with an $O_2/H_2S$ molar ratio ranging from 0.05 to 15;

contacting the $O_2/H_2S$-containing mixed phase with a catalyst for the selective oxidation of $H_2S$ to sulphur disposed in an oxidation zone, wherein the catalyst comprises a catalytically active phase containing at least one oxysulphide of at least one metal selected from the group consisting of nickel, iron, cobalt, copper, chromium, molybdenum and tungsten combined with a silicon carbide support, at a temperature of between 35° C. and 70° C. and depositing the sulphur on the catalyst;

maintaining the oxidation zone at the temperature of between 35° C. and 70° C. by injecting into the zone a stream of cooled water circulating continuously;

periodically regenerating by flushing the sulphur-laden catalyst using a non-oxidizing gas at temperature of between 200° C. and 500° C. to vaporize sulphur retained on the catalyst; and cooling the regenerated catalyst below the dew point of the sulphur to a temperature for the $H_2S$ oxidation to be carried out again, such cooling being carried out by a gas having a temperature less than 180° C.

30. The process according to claim 29, wherein the gas/condensed water mixed phase to be treated, brought into contact with the $H_2S$ oxidation catalyst, circulates counter-currently with respect to the stream of cooled water injected into the oxidation zone, a purified gas substantially free of sulphur compounds is discharged from the top of the oxidation zone, a stream of water laden with solid sulphur particles is withdrawn from the bottom of the zone and a portion of the stream of water is recycled, after separating the sulphur that it contains and cooling, to form the stream of cooling water injected into the oxidation zone.

31. The process according to claim 29, wherein the gas/condensed water mixed phase to be treated, brought into contact with the $H_2S$ oxidation catalyst, circulates cocurrently with respect to the stream of cooled water injected into the oxidation zone, a purified gas/condensed water mixture, laden with solid sulphur particles, is withdrawn from the bottom of the oxidation zone, the mixture is separated into a stream of purified gas, which is discharged, and an aqueous phase, and a portion of this aqueous phase is recycled, after separating the sulphur that it contains and cooling, to form the stream of cooling water injected into the oxidation zone.

* * * * *